C. J. ENGLE, B. W. FREEMAN & D. E. NEAL.
STEERING GEAR.
APPLICATION FILED MAR. 28, 1910.
1,029,052.
Patented June 11, 1912.
2 SHEETS—SHEET 1.
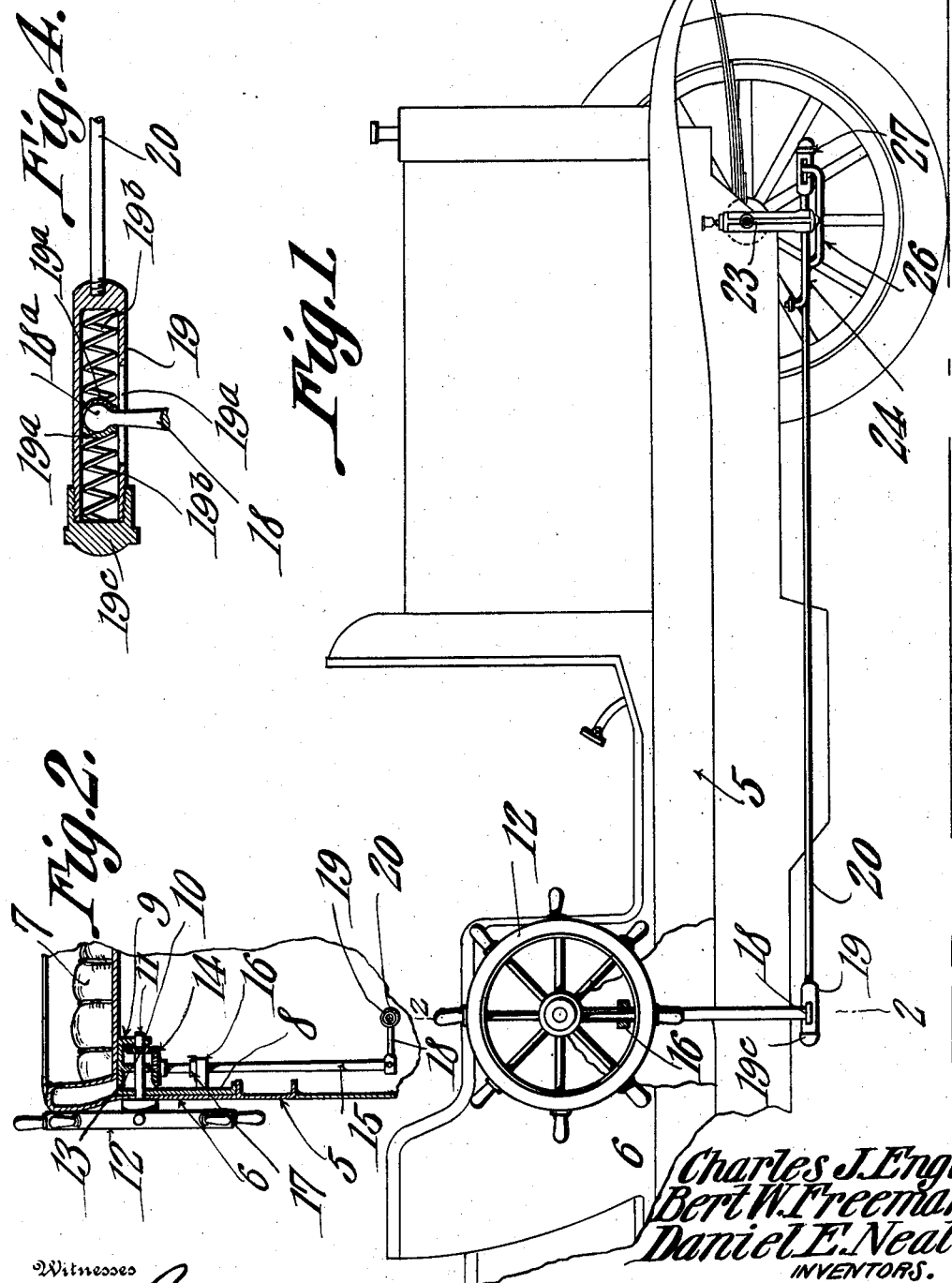
Charles J. Engle,
Bert W. Freeman,
Daniel E. Neal
INVENTORS.
By C. A. Snow & Co.
Attorneys
Witnesses

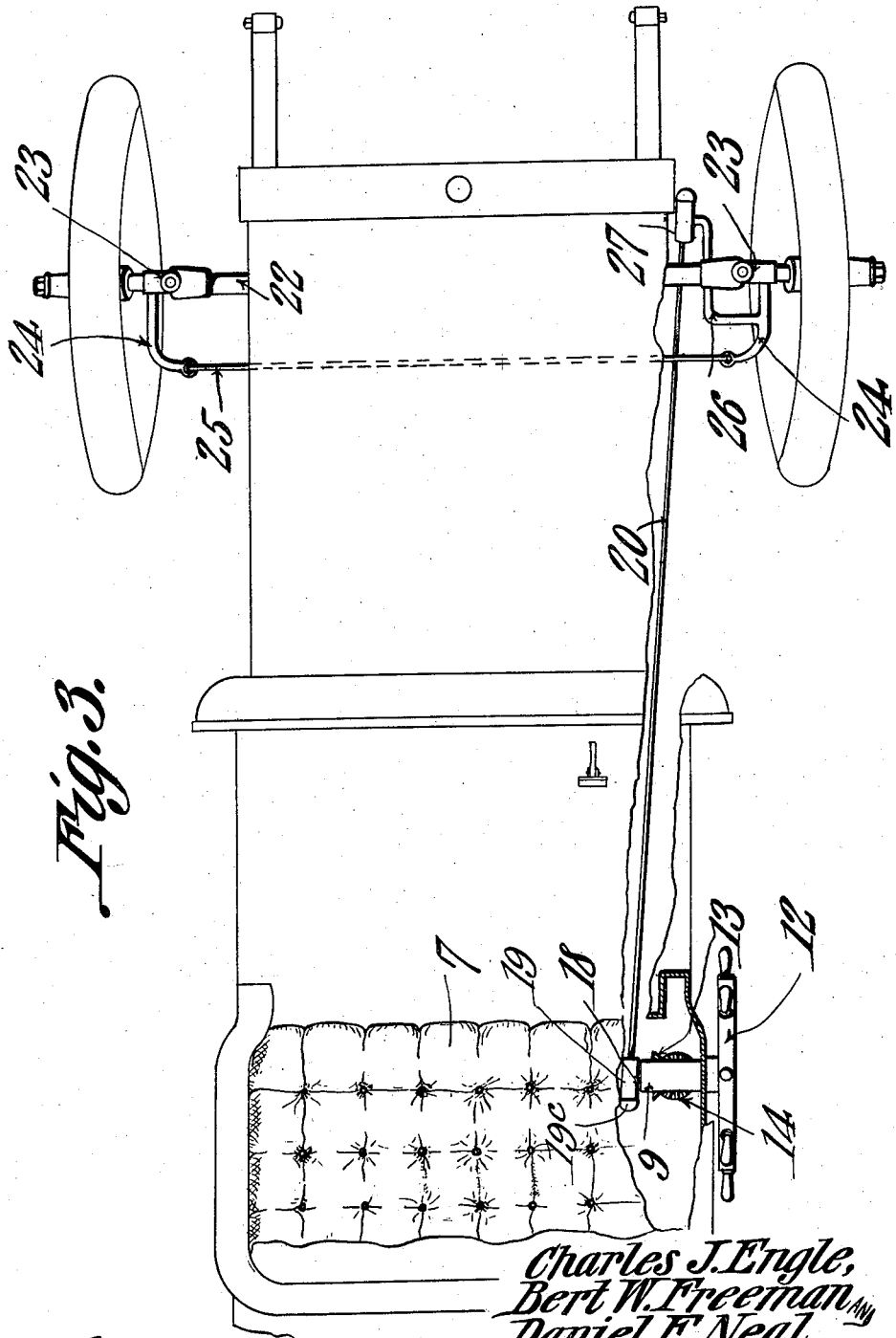

UNITED STATES PATENT OFFICE.

CHARLES J. ENGLE, BERT W. FREEMAN, AND DANIEL E. NEAL, OF MOLINE, ILLINOIS.

STEERING-GEAR.

1,029,052.    Specification of Letters Patent.    Patented June 11, 1912.

Application filed March 28, 1910. Serial No. 552,032.

*To all whom it may concern:*

Be it known that we, CHARLES J. ENGLE, BERT W. FREEMAN, and DANIEL E. NEAL, citizens of the United States, residing at Moline, in the county of Rock Island and State of Illinois, have invented a new and useful Steering-Gear, of which the following is a specification.

This invention is a steering gear designed more particularly for motor vehicles, and it is the object of the invention to provide a mechanism of this kind in which the steering wheel is entirely out of the way of the driver, and also to provide a gear by which the vehicle can be readily controlled with one hand, thus leaving the other hand of the driver free to operate the brake and other levers.

With these objects in view, the invention consists in a novel construction and arrangement of parts to be hereinafter described and claimed, reference being had to the drawings hereto annexed in which—

Figure 1 is a side elevation of the front end of the motor vehicle, partly broken away, showing the application of the invention. Fig. 2 is a transverse section on the line 2—2 of Fig. 1. Fig. 3 is a plan view, partly broken away. Fig. 4 is a sectional detail of the yielding connection hereinafter referred to.

Referring more particularly to the drawings, 5 denotes the car frame; 6, one of the side walls of the car; and 7, the front seat. On the frame 5, behind the wall 6, is mounted a standard 8 having a lateral extension 9 at its upper end which is secured to the seat bottom, on the under side thereof. On the extension 9 are bearings 10 in which is journaled a horizontal shaft 11 which also passes through a bearing opening in the standard 8, and through an opening in the wall 6 to the outside thereof, the outer end of said shaft being fitted with a hand wheel 12 located close to the side wall, so as to be within easy reach of the driver occupying the seat 7. The rim of the hand wheel 12 is fitted with radially extending grips or hand holds.

On the shaft 11 is fast a bevel gear 13 which is in mesh with a bevel gear 14 fast on the upper end of a vertical shaft 15 journaled in a bearing arm 16 projecting from the standard 8. On the shaft 15 is fixed a collar 17 which engages the top of the bearing arm, whereby the shaft is prevented from dropping down to disengage its bevel gear from the bevel gear of the shaft 11. To the lower end of the shaft 15 is made fast an arm 18 formed at its extremity with a ball 18ᵃ working in a tube 19, to one end of which tube a rod 20 is connected. The tube has a slit through which the arm passes into the same. The ball is received between two cupped washers 19ᵃ between which, and the respective ends of the tube, are interposed coiled springs 19ᵇ. One end of the tube is closed by a removable screw cap 19ᶜ. These parts provide a slightly yielding connection between the shaft 15 and the rod 20.

The front axle 22 of the car is provided with the usual steering knuckles 23 which carry rearwardly extending arms 24 connected by a rod 25 as usual, so that the two front wheels may swing together. From the arm of one of the steering knuckles extends a lateral branch 26 which is connected at its extremity to a tube 27 similar to the tube 19, and in the same manner as the connection between the tube 19 and the arm 18. The tube 27 is secured to the front end of the rod 20. This structure provides a slightly yielding connection between the rod 20 and the arm 26.

The car is steered by rotating the shaft 11, which is done by means of the hand wheel 12. The motion of the shaft 11 is transmitted to the steering arm by the gears 13 and 14, shaft 15, arm 18 and rod 20. The parts are few and simple, and can be readily applied to any ordinary motor vehicle. Inasmuch as the hand wheel 12 is located on the outside of the vehicle body, and the shaft 11 is under the seat, these parts are entirely out of the way of the driver occupying the seat, and the position of the hand wheel is also such that it can be readily operated with one hand, leaving the other hand of the driver free to operate the brake and other levers.

Steering mechanisms such as heretofore generally used have been of three general types to wit, that in which a steering wheel is supported in front of the driver; that type in which a shaft extends upwardly at one side of the seat and is operated by a handle extending in front of the driver; and that in which the mechanism is operated by an upwardly extending side lever. While all of these types are efficient while the machine is being propelled under its own power, it is practically impossible to use them for steering the machine while it is being pushed, unless a person is occupying the seat of the car. By providing a steering wheel such as shown in the drawings and which has a plurality of radially extending handles, said wheel can be easily operated by a person standing on the ground at one side of the machine. At least one of the handles or grips is always at a point where it can be conveniently grasped while the machine is being pushed. The provision of a plurality of handles is also advantageous because the occupant of the seat can grasp any one of them for the purpose of actuating the steering mechanism, thus enabling him to hold his hands normally in the position most convenient to him.

What is claimed is:

The combination with a vehicle body and a seat, of an upstanding shaft journaled within the body and under the seat, a laterally extending shaft journaled under the seat, and extending beyond one side of the body, means for transmitting motion for said laterally extending shaft to the upstanding shaft, steering wheels, means operated by the upstanding shaft for shifting the wheels, a wheel supported in a plane parallel with one side of the body, said wheel being secured to the laterally extending shaft outside of and close to the seat, and radially extending handles upon the peripheral portion of said wheel, certain of the handles constantly extending upwardly and forwardly beyond the seat.

In testimony that we claim the foregoing as our own, we have hereto affixed our signatures in the presence of two witnesses.

CHAS. J. ENGLE.
BERT W. FREEMAN.
DANIEL E. NEAL.

Witnesses:
 MAGNUS OLSON,
 ANDREW OLSON.